United States Patent [19]
Benz et al.

[11] Patent Number: 6,027,170
[45] Date of Patent: Feb. 22, 2000

[54] ROTATING VEHICLE SEAT

[75] Inventors: Walter E. Benz, Sumner; Daniel J. Farmer, Kirkland, both of Wash.

[73] Assignee: Paccar Inc, Bellevue, Wash.

[21] Appl. No.: 09/252,850

[22] Filed: Feb. 19, 1999

[51] Int. Cl.$^7$ ............................. B60N 2/14; A47C 1/02
[52] U.S. Cl. ........................ 297/344.21; 297/344.26; 248/425
[58] Field of Search ................ 297/344.21, 344.24, 297/344.26; 248/424, 425; 296/65.06, 65.07

[56] References Cited

U.S. PATENT DOCUMENTS

| | | | |
|---|---|---|---|
| 2,822,858 | 2/1958 | Mussler | 297/344.24 |
| 3,013,837 | 12/1961 | Pessl et al. | 297/344.21 X |
| 3,066,979 | 12/1962 | Pitts et al. | 297/344.24 |
| 4,844,543 | 7/1989 | Ochial | 297/344.26 |
| 5,390,978 | 2/1995 | Janisch | 297/344.24 |

*Primary Examiner*—Anthony D. Barfield
*Attorney, Agent, or Firm*—Christensen O'Connor Johnson & Kindness PLLC

[57] ABSTRACT

A seat assembly (11) is described including a seat (12), a support base (14), and an orbital guide assembly (16). The orbital guide assembly includes a first plate (30) connected to the support base, a second plate (32) connected to the seat, and an intermediate low-friction member (34) positioned between the first and second plates. The first plate includes at least two male elements (40), (42), such as guide pins. The second plate includes at least two arcuate female elements (50), (52), such as slots, adapted to engage their respective male elements. During use, the first pin acts as a first pivot point while the second pin translates along its corresponding second arcuate slot. Once the second pin completes its translation, the second pin then acts as a second pivot point while the first pin translates along its corresponding first arcuate slot. Various additional male and female elements may be used, either as stabilizing components or as additional pivot points.

10 Claims, 3 Drawing Sheets

ROTATING VEHICLE SEAT

FIELD OF THE INVENTION

The present invention relates to rotatable seats, and more particularly to rotatable seats for use in vehicles, such as trucks, cars, trains, tractors, buses, motor homes, trailers, etc.

BACKGROUND OF THE INVENTION

Numerous types of vehicles use rotating seats to enable the operator to enter and exit the seat more easily. Many of these vehicle cab environments are constrained for space. By way of example, FIG. 1 is a simplified planform drawing of a typical truck cab arrangement having a driver's seat 6, a steering wheel 7, storage cabinets 8, an instrument console 9, and a center gear assembly 10. As shown, there is very little space within the truck cab for the driver to fully rotate his or her seat. Instead, the driver must perform a combination of movements in order to maneuver the seat around the various components. The combination of movements usually involves rotating the seat slightly about a central axis to clear one object, then linearly sliding the seat rearward to clear another object, then continuing rotation the seat about its central axis to clear a third object, and so forth. To bring the seat back to the operative position, the user must perform the same steps in reverse order.

While this arrangement is effective, it is somewhat cumbersome. Thus, a need exists for a vehicle seat in which the user can move between an operative position and various inoperative positions without having to spend a lot of time, effort, and energy in doing so. The present invention is directed to fulfilling these and other needs as described below.

SUMMARY OF THE INVENTION

In accordance with aspects of the present invention, a seat assembly is provided including a seat, a support base, and an orbital guide assembly. The orbital guide assembly includes a first plate connected to the support base, a second plate connected to the seat, and an intermediate low-friction member positioned between the first and second plates. The first plate includes two or more male elements. The second plate includes two or more arcuate female elements adapted to engage the male elements. During use, a first male element acts as a first pivot point while a second male element translates along its corresponding second arcuate female element. Once the second male element completes its translation, the second male element acts as a second pivot point while the first male element translates along its corresponding first arcuate female element.

In accordance with aspects of this invention, an improvement is provided to a vehicular seat assembly. The improvement includes an orbital guide assembly for providing multiple pivot points about which the seat will rotate sequentially during use. The various paths proscribed by the orbital guide assembly are formed to ensure movement of the seat in a manner that avoids objects surrounding the seat.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a swiveling seat assembly for use with vehicles. The assembly is described below as applied to a truck, however, the present invention may be used with numerous types of vehicles, such as trucks, cars, trains, tractors, buses, trailers, motor homes, etc. In general, the seat assembly includes a seat, a support base, and an orbital guide assembly located between the seat and the support base. The orbital guide assembly proscribes a series of motions that enable the operator to manuever the seat to clear various obstacles in its path. The seat motion is determined by a series of predefined pivot points within the guide assembly. The guide assembly further enables the operator to stop the seat at various lateral positions without requiring the operator to reposition the seat in the fore and aft direction.

Figure 1:
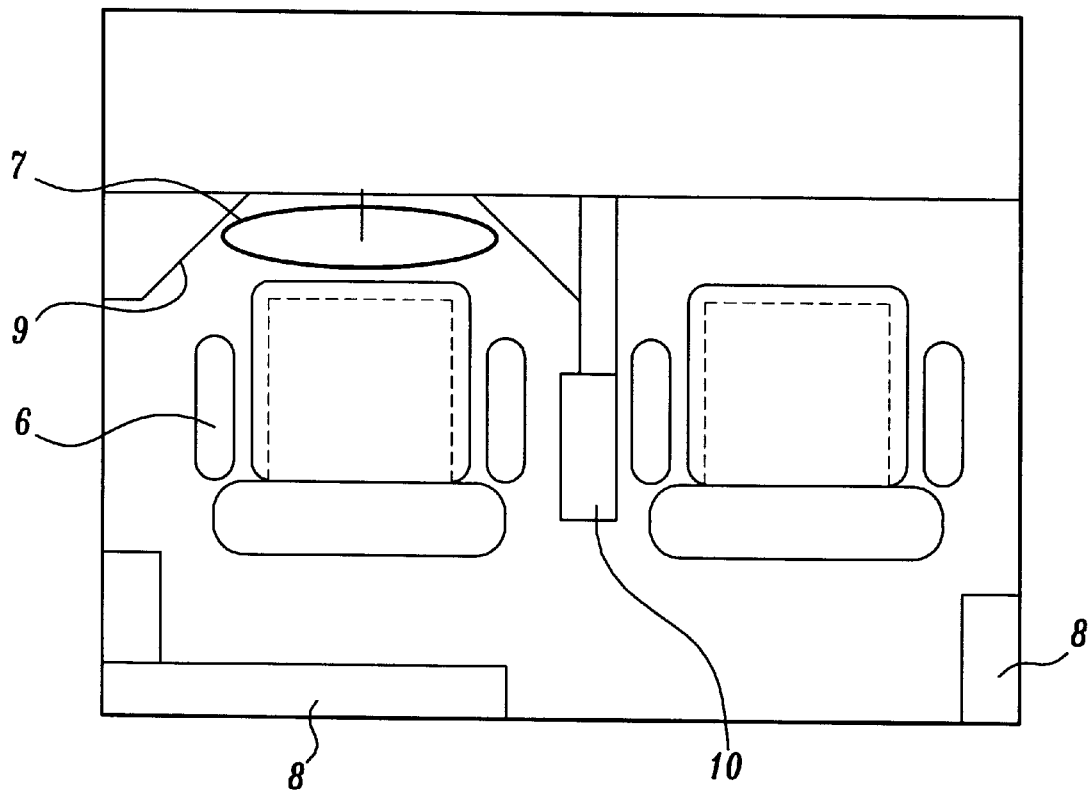
FIG. 1 is a simplified planform drawing of a typical truck cab arrangement.
Figure 5:
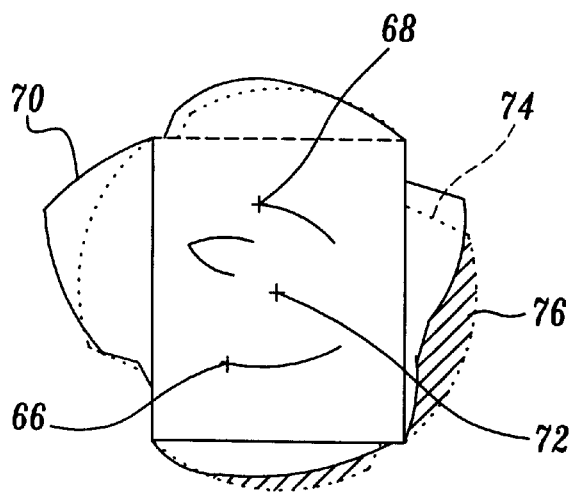
FIG. 5 is a planform view of the resulting motion of the embodiment of FIG. 3, the motion resulting from a single axial rotation of the seat shown being in phantom for comparison.
Figure 2:
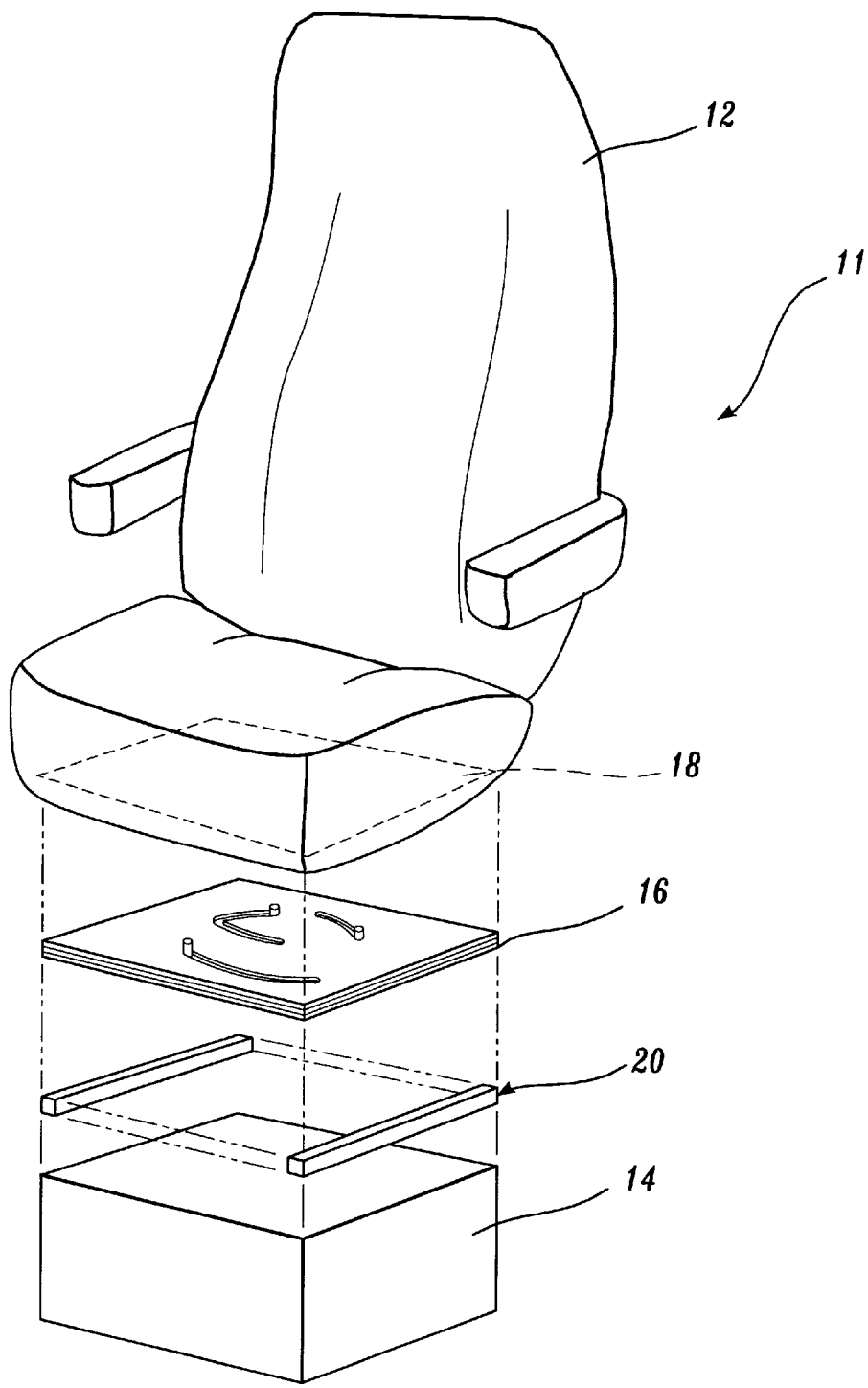
FIG. 2 is a perspective view of one embodiment of a seat assembly formed in accordance with the present invention, including an orbital guide assembly shown in FIG. 3.

In more detail and referring to FIG. 2, the seat assembly 11 includes a seat 12, a support base 14, and an orbital guide assembly 16 located between the seat 12 and the support base 14. The seat 12 has a lower support structure 18 to which the orbital guide assembly is connected. The guide assembly also connects to the support base 14. In the embodiment of FIG. 5, an intermediate slide assembly 20 is provided between the connection of the guide assembly 16 to the support base 14. Alternatively, the guide assembly may be located between the support base and the intermediate slide assembly. Numerous other arrangements are possible, depending on the type of seat desired and the particular application. The important aspect of the configuration is that the components of the guide assembly are made to move relative to one another as described below.

Figure 3:
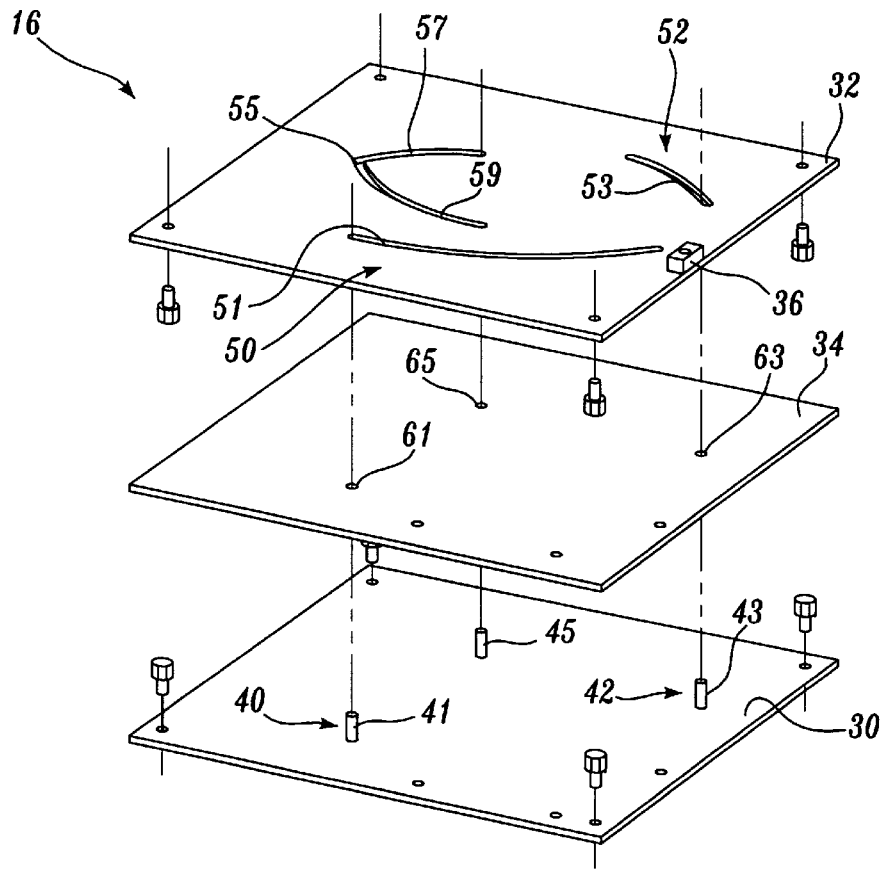
FIG. 3 is an exploded perspective view of one embodiment of an orbital guide assembly formed in accordance with the present invention.

FIG. 3 is an exploded perspective view of one embodiment of an orbital guide assembly formed in accordance with the present invention. The assembly includes a first plate 30, a second plate 32, and a low friction intermediate member 34. As shown in FIG. 3 the first plate 30 is positioned beneath the second plate 32, with the low friction intermediate member 34 positioned therebetween. The first plate 30 is attached to the support base 14 using conventional fasteners (e.g., bolts, rivets, screws, clamps, etc.) The second plate 32 is attached to the lower support structure 18 of the seat, also using conventional fasteners. The guide assembly 16 includes a locking mechanism 36 to prohibit movement between the first and second plates. The locking mechanism shown includes a lever-actuated spring-loaded pin attached to the second plate which passes through the intermediate plate and engages a hole, or various holes, in the lower plate. The holes correspond to the orientations at which an operator may want to lock the seat assembly.

The orbital guide assembly 16 further includes at least two upright male elements 40, 42 extending a short distance upward from the upper surface of the first plate 30. The second plate 32 includes at least two female elements 50, 52 designed to engage the male elements during use. As used herein, the term "male elements" and the term "female elements" are meant to describe components that mate, or engage, with one another to perform the prescribed motion. In this regard various types of mating components may be used. For example, the male elements shown in FIG. 3 are upright pins affixed to the first plate and the female elements are slots formed in the second plate. Other types of male/female mating components may be used, e.g., rollers that engage tracks, slotted bosses that engage edges, bearings that engage grooves, etc.

The embodiment of FIG. 3 includes a first upright pin 41, a second upright pin 43, and a third upright pin 45. The low friction intermediate member 34 includes three holes 61, 63, 65 through which the upright pins 41, 43, 45 extend to engage corresponding slots 51, 53, and 55 in the second plate 32. The third slot 55 includes first and second arcuate portions 57, 59. The size, shape, and orientation of the slots 51, 53, 55 define the specific rotational movement of the seat. The pins 41, 43, 45 act as pivots and guides.

Figure 4:
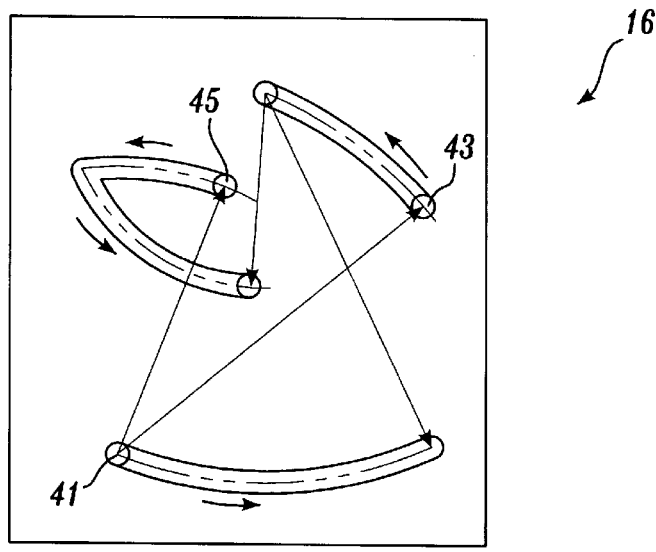
FIG. 4 is a planform view of the embodiment of FIG. 3.

Referring to FIG. 4, during use, the operator shifts his or her weight to cause the seat 12 and the second plate 32 to rotate relative to the first plate 30 about the first pin 41. This causes the second pin 43 to translate along its corresponding slot 53 and the third pin 45 to translate along its corresponding slot 55 within its first portion 57. In this regard, slot 53 and 57 define concentric arcuate portions relative to the first pin 41, of equal angular distance. Once the second pin 43 reaches the end of the second slot 53, the user shifts his or her weight to allow the second pin 43 to become the next pivot point. The user can then rotate the second plate 32 relative to the first plate 30 about the second pin 43. This causes the first pin 41 to translate along the first slot 51 and the third pin 45 to translate along its corresponding slot 55 within its second portion 57. In this regard, slot 45 and 57 define concentric arcuate portions relative to the second pin 43, of equal angular distance.

In the embodiment of FIGS. 3 and 4, the third pin 45 does not ever serve as a pivot point. The third pin 45 is provided to stabilize the guide assembly and avoid any binding between the plates. Additional pivot points, as well as additional stabilizing elements, may be used depending on the needs of a particular application. To provide more complicated motions, multiple guide assemblies may be used by stacking the guide assemblies on top of each other and connecting the first plate of the upper guide assembly to the second plate of the lower guide assembly, and so forth.

FIG. 5 is a planform view of the resulting motion of the embodiment of FIG. 3. The two pivot points, items 66 and 68, correspond with the locations of the first and second pins 41 and 43 during movement of the assembly. This arrangement results in the outline of motion labeled item 70. The motion resulting from rotation of the seat about a single axis labeled 72 is shown in phantom for comparison, with the outline of the resulting motion labeled item 74). The crosshatched area 76 corresponds to the area avoided by the seat during its motion using the multiple pivot points of the present invention. The area shown will depend on the configuration of the guide assembly, and particularly upon the size, number, and orientation of the mating elements.

The first and second plates are shown in FIGS. 3 and 4 as having square shapes. Other shapes may be used. Likewise, the low friction intermediate member is shown as a single square plate sandwiched between the first and second plates. Alternatively, the intermediate member may be provided with a number of separate low friction washers that surround each of the upright pins. See, for example, item 34' in FIG. 3 In one embodiment, the low friction intermediate member is formed of a low friction material such as polypropylene, Teflon, brass, polished and lubricated steel, etc.; the first and second plates are formed from a rigid material such as steel, aluminum, structural plastic, die cast magnesium, etc.

As will be appreciated from the above, the present invention provides an efficient swiveling seat that is easy to use. In addition, the predefined orbital motion of the seat avoids any opportunity for the operator to inadvertently bump into a surrounding component.

While the preferred embodiment of the invention has been illustrated and described, it will be appreciated that various changes can be made therein without departing from the spirit and scope of the invention. For example, the support base is preferably a suspension box having various shock absorbers and springs, although other types of support bases may be used. In some vehicles it may be possible to connect the guide assembly directly to the vehicle floor structure. In addition, in an alternative embodiment, the guide assembly is formed "upside down" so that the male elements are above the female elements.

The embodiments of the invention in which an exclusive property or privilege is claimed are defined as follows:

1. A seat assembly comprising:
   (a) a seat;
   (b) a support base;
   (c) an orbital guide assembly comprising:
      (i) a first plate connected to the support base and having at least a first male element and a second male element;
      (ii) a second plate connected to the seat and having at least a first arcuate female element and a second arcuate female element;
      (iii) an intermediate low-friction member positioned between the first and second plates, the male elements extending through the intermediate member to engage their respective female elements;
   wherein during use, the first male element acts as a first pivot point while the second male element translates along its corresponding second arcuate female element; once the second male element completes its translation, the second male element acts as a second pivot point while the first male element translates along its corresponding first arcuate female element.

2. The seat assembly according to claim 1, wherein the first plate includes a third male element and the second plate includes a third arcuate female element for engaging the third male element; the third male and female elements providing stabilization to the guide assembly during use.

3. The seat assembly according to claim 2, wherein the male elements are pins and the female elements are slots sized to engage the pins.

4. The seat assembly according to claim 3, wherein the intermediate low-friction member includes a number of washers, one for each male element.

5. The seat assembly according to claim 1, wherein the intermediate low-friction member is formed from a sheet of polypropylene and the first and second plates are formed from sheets of metal.

6. In a vehicular seat assembly having a seat and a support base, an improvement comprising an orbital guide assembly including:
   (i) a first plate connected to the support base and having at least a first male element and a second male element;

(ii) a second plate connected to the seat and having at least a first arcuate female element and a second arcuate female element;

(iii) an intermediate low-friction member positioned between the first and second plates, the male elements extending through the intermediate member to engage their respective female elements;

wherein during use, the first male element acts as a first pivot point while the second male element translates along its corresponding second arcuate female element; once the second male element completes its translation, the second male element acts as a second pivot point while the first male element translates along its corresponding first arcuate female element.

7. The improvement according to claim 6, wherein the first plate includes a third male element and the second plate includes a third arcuate female element for engaging the third male element; the third male and female elements providing stabilization to the guide assembly during use.

8. The seat assembly according to claim 7, wherein the male elements are pins and the female elements are slots sized to engage the pins.

9. The seat assembly according to claim 6, wherein the intermediate low-friction member is formed from a sheet of polypropylene and the first and second plates are formed from sheets of metal.

10. In a vehicular seat assembly having a seat and a support base, an improvement comprising:

an orbital guide assembly comprising:

(i) a first plate connected to the support base and having a first pin, a second pin, and a third pin;

(ii) a second plate connected to the seat and including a first arcuate slot, a second arcuate slot, and a third arcuate slot having a first portion and a second portion;

(iii) an intermediate low-friction member positioned between the first and second plates, the male elements extending through the intermediate member to engage their respective female elements;

wherein during use, the first pin acts as a first pivot point while the second pin translates along the second arcuate slot and the third pin translates along the third arcuate slot first portion; once the second pin completes its translation, the second pin acts as a second pivot point while the first pin translates along the first arcuate slot and the third pin translates along the third arcuate slot second portion; the third pin and slot providing stabilization to the guide assembly during use.

* * * * *

UNITED STATES PATENT AND TRADEMARK OFFICE
CERTIFICATE OF CORRECTION

PATENT NO. : 6,027,170
DATED : February 22, 2000
INVENTOR(S) : W.E. Benz et al.

It is certified that error appears in the above-indentified patent and that said Letters Patent is hereby corrected as shown below:

COLUMN  LINE

[73] Assignee  "Paccar" should read --PACCAR--
Pg. 1, col. 1

Signed and Sealed this

Twenty-seventh Day of March, 2001

Attest:

NICHOLAS P. GODICI

Attesting Officer    Acting Director of the United States Patent and Trademark Office